United States Patent [19]

Anderson et al.

[11] 3,920,625
[45] Nov. 18, 1975

[54] ISOLATION OF COAGULATION FACTORS FROM BIOLOGICAL MATERIAL USING CROSS LINKED SULFATED, SULFONATED CARBOHYDRATES

[75] Inventors: Lars-Olov Andersson, Knivsta; Håkan Gunnar Borg, Huddinge; Nanna Forsman; Gunnar Hanshoff, both of Jarfalla; Göran Lindroos, Stockholm; Maggie Miller-Andersson, Jarfalla; Elisabeth Charlotte Ehrenberg, Dalby, all of Sweden

[73] Assignee: AB Kabi, Stockholm, Sweden

[22] Filed: June 19, 1973

[21] Appl. No.: 371,491

[52] U.S. Cl............... 260/112 B; 424/101; 424/177
[51] Int. Cl.² .......................................... C07G 7/00
[58] Field of Search ................................ 260/112 B

[56] References Cited
UNITED STATES PATENTS

| | | | |
|---|---|---|---|
| 2,543,808 | 3/1951 | Seegers et al. | 260/112 B |
| 3,631,018 | 12/1971 | Shanbrom et al. | 260/112 B |
| 3,652,530 | 3/1972 | Johnson et al. | 260/112 B |
| 3,682,881 | 8/1972 | Fekete et al. | 260/112 B |
| 3,803,115 | 4/1974 | Fekete et al. | 260/112 B |
| 3,842,061 | 10/1974 | Andersson et al. | 260/112 B |

OTHER PUBLICATIONS

J. of Biochimica Biophysica Acta, 221 (1970), 677–679, Van Mourik et al.
Chem. Abstracts, Vol. 77, 1972, 71654S, Weiss et al.
Modern Biochemistry, 3rd Edition, 1970, Karlson, pp. 67–69.
Chem. Abstracts, Vol. 78, 1973, 81267C, Gentry et al.

*Primary Examiner*—Howard E. Schain

[57] ABSTRACT

The blood coagulation factors I (fibrinogen), VIII (antihemophilia factor, abbreviated AHF), and factor IX (also called B-factor) are isolated in high yields from animal tissue materials such as blood or blood products (e.g. plasma) or plasma fractions, or the B-factor is purified from a B-factor concentrate, by a procedure involving the essential step of adsorption (as in affinity chromatography) of at least one of these factors, in a liquid system, onto a water-insoluble gel matrix primarily composed of a cross-linked sulfated or sulfonated, gel-forming carbohydrate such as cross-linked dextran sulfate-agarose, cross-linked dextran sulfate-dextran, cross-linked heparin-agarose and other such gel matrix-providing substances.

1 Claim, No Drawings

ISOLATION OF COAGULATION FACTORS FROM BIOLOGICAL MATERIAL USING CROSS LINKED SULFATED, SULFONATED CARBOHYDRATES

This invention is that of isolating blood coagulation factors I (fibrinogen), VIII (antihemophilia factor, abbreviated AHF), and factor IX (also called B-factor) in high yields from animal tissue materials such as blood or blood products (e.g. plasma) or plasma fractions, or the B-factor is purified from a B-factor concentrate, by a procedure involving the essential step of adsorption (as in affinity chromatography) of at least one of these factors, in a liquid system, onto a water-insoluble gel matrix primarily composed of a cross-linked sulfated or sulfonated, gel-forming carbohydrate such as cross-linked dextran sulfate-agarose, cross-linked dextran sulfate-dextran, cross-linked heparin-agarose andn other such gel matrix-providing substances, e.g. benzidine-2,2-disulfonic acid-agarose.

Considerable work has been performed throughout the years in seeking to recognize the mechanisms of blood coagulation and to isolate the participating components. The great interest in the coagulation of blood can be accounted for partly by the purely scientific concern about the system as such. However, first of all, knowledge of how the coagulation of blood takes place and how it can be influenced is extremely important from a clinical point of view. There are still a number of unclear points concerning the mechanisms of blood coagulation, but there is unanimity that blood coagulation may be described as a process wherein activation of a trace component is followed by successive activation of a number of components, which eventually results in the formation of a clot. A relatively small initial effect thus results in a valuable final effect depending on the multiplying effect which exists in the system.

However, only a few of the various components participating in the blood coagulation system have so far been isolated in pure state. These components usually are called coagulation factors, and are presumed to be twelve in number, with each designated by its respective Roman numeral, i.e. factor I, factor II, and so on, according to the nomenclature established by the International Commission on Haemostasis and Thrombosis (Thromb. Diathes, Haemorrhag. Suppl. 13, 1964).

In connection with the blood coagulation factors there is reason also to mention two other systems. One of them is the system of inhibitors, which regulates the tendency of the blood to coagulate and prevents the formation of thrombi. This system contains, among others antithrombin III, factor $X_a$ inhibitor, factor $XI_a$ inhibitor. The formed, namely, one is the system which attends to the dissolution of possible thrombi, and usually is called the fibrinolytic system. It contains plasmin and plasminogen as important components.

Coagulation factor I, i.e. fibrinogen, is (i) the structural element that forms the gel that results from the coagulation of blood or plasma, and (ii) a protein with a molecular weight of about 340,000. Its concentration in the plasma is about 2 mg./ml. of plasma. During the blood coagulation process an enzyme is formed, thrombin which hydrolytically splits off two peptides from the fibrinogen. The splitting-off of these peptides from the fibrinogen causes the latter to alter its structure and as altered to start aggregating. This aggregation results in the formation of a gel, i.e. a clot.

Fibrinogen is used clinically to stop certain type of bleeding. It is relatively difficult to produce fibrinogen for clinical use. Since fibrinogen is a relatively sensitive molecule, the fractionation methods in its production have to be very mild. The greatest difficulty is to obtain a quality of fibrinogen with high coagulability and which at the same time manifests good stability in aqueous solution.

Coagulation factor VIII, the antihemophilia factor (briefly called AHF), is a protein with a molecular weight of about 1 million. It is present in very small amounts in blood plasma, its normal concentration being about 10 $\mu$g./ml. of plasma. One of the most known hereditary coagulation defects is characterized by the absence of the biologically active factor VIII (AHF). This defect is the classical hemophilia or hemophilia A. Heavy hemophilia manifests itself as a strongly increased bleeding tendency where the least would may give rise to a mortal bleeding.

This disease manifests itself even at a very young age, and many different types of complications may occur. Quite usually the patients get repeated joint bleedings leading to inflammations (at joints) and in the long run to invalidism. This causes most of the grave hemophiliacs to be heavily motility-wise disturbed even at the age of 20 years if they have not been treated with preparations containing AHF.

The therapy which can be used in hemophilia is transfusion of whole (human) blood or plasma and even various concentrates containing AHF. The medicinal advantages of using such concentrates are obvious. The AHF concentrates presently available can be divided into two different types, partly high concentrated and partly low concentrated preparations. The preparations mostly used heretofore are of the low concentrated type. Examples of them are cryoprecipitates according to Pool (Pool J., Hershgold, E. K., Pappenhagen, A., Nature 203 (1964) p.312), and Cohn fraction I-O (described in Blomback, M. Arkiv Kemi 12 (1958) p. 387).

Both of these AHF low concentrate preparations contain considerable amounts of fibrinogen. The disadvantage with this type of preparation is that the patients need administration of relatively large quantities of an aqueous solution of it by infusion. Lately certain so called highly concentrated AHF preparations have been developed. With these an adequate dosis of AHF can be given in an aqueous solution volume of from 10 to 15 ml. This type of AHF concentrate is considerably easier to use than the earlier type.

Clinically the highly concentrated preparations seem to function well, but there also are certain disadvantages with them. From an isolation standpoint a disadvantage with them is that the yield of AHF-activity from the starting plasma is relatively low. Furthermore, the other proteins which occur in the fractions from which AHF is recovered generally are not utilized. Finally, these methods require a very high grade starting material, i.e. the blood plasma should be fresh or frozen immediately after the collection of the blood and subsequent centrifugation.

Coagulation factor IX, also known as B-factor because one type of hemophilia, namely, hemophilia B, is caused by hereditary deficiency of the coagulation factor IX. Hemophilia B manifests itself as a strongly increased bleeding tendency at trauma and surgical interventions. In grave cases large subcutaneous and intramuscular haematoma may occur. Junction bleedings with secondary junction deformities resulting in invalidism also is a rather common condition in connection with hemphilia B. The treatment which can be given is any of various forms of substitutional therapy, namely, transfusion of blood, plasma or some of the now available factor IX concentrates.

The treatment can be either prophylactic and be given for a long period, among others, in order to prevent the genesis of the above-mentioned junction damages, or else it can be given in connection with operations, extraction of teeth, and other situations wherein the risk of bleeding is great. The methods of treatment now available have many disadvantages. The transfusion of blood and plasma implies a risk of the transmission of hepatitis and to some extent of provoking immunization. With the factor IX concentrates now available there is an obvious risk of transmission of hepatitis.

The present invention makes it possible to eliminate the above-mentioned disadvantages. The various procedures, embraced by the invention, for isolating the coagulation factors I, VIII, and IX have in common that they include the essential novel step of adsorbing one or more of them, from an aqueous liquid system onto and adsorption medium which is a sulfated, or sulfonate group-containing, cross-linked gel matrix-forming carbohydrate. Thus, these are bound on the gel and purified in this way. In the purification or isolation of coagulation factor VIII, the sulfated gel matrix is used to adsorb the dominating fraction i.e. fibrinogen, from the starting material.

Runs using blood plasma as the starting material showed that under suitable conditions factor I and factor IX could be induced to be bound almost quantitatively on the heparin-containing agarose gel, i.e. each of these factors separately.

Each of these factors I and IX respectively then is eluted by contacting the adsorbate-holding gel with a buffer differing in composition from that wherein the protein material was dissolved. Variations occur in the purity of the starting protein fractions. However, considerably better results were obtained when using as the starting material the Cohn fraction I paste (Journal of the American Chemical Society, 1946; volume 48 page 459) and also when using a B-factor concentrate.

It is a feature of the invention that both coagulation factor I and factor VIII can be isolated, so to speak, sequentially from the same starting material, such as from Cohn fraction I-O or a cryoprecipitate (Pool et al., above). For example, runs conducting on this phase of the invention using dextran sufateagarose (the agarose specifically as SEPHAROSE 4B, a beaded agarose gel prepared by allowing a 4 percent solution of agarose to gel in bead form, a product of Pharmacia Fine Chemicals of Piscataway, N.J., U.S.A., and of Uppsala, Sweden) showed that it was possible to absorb the main part of the fibrinogen on the gel and to have the AHF-activity left in the (non-adsorbed) solution almost quantitatively.

Thereafter the gel is separated, and the AHF left in the solution is precipitated by known procedures (e.g. as seen above, p. 4 lines 13–14 in Pool, Hershgold and Pappenhagen). Subsequently, a highly concentrated solution of AHF can be obtained by dissolving this precipitate in a small quantity of a buffer protein solvent. The fibrinogen can be eluted from the dextran sulfate-SEPHAROSE gel by a buffer of increased ionic strength (e.g. adding sodium chloride to the composition of the non-adsorbed solution). This fibrinogen can be precipitated later and separated and a highly concentrated solution be prepared from it.

This kind of procedure has many advantages compared with theh earlier used procedures for obtaining highly concentrated AHF preparations, for example, above all the AHF yield is significantly higher.

An additional advantage is that in addition to the high yield of AHF, the fibrinogen eluted from the gel matrix in the same overall isolation procedure likewise can be used. A further valuable advantage is that even outdated blood or like blood or like blood plasma can be used in this new procedure as the starting material source for the AHF as well as for fibrinogen.

In factor IX preparations a factor IX concentrate prepared by adsorption of factor IX jointly with several other proteins to DEAE-SEPHADEX (an epichlorohydrin cross-linked diethylamino -ethyl dextran in bead form, product of Pharmacia Fine Chemicals, of Piscataway, N. J., U.S.A. and of Uppsala, Sweden) from the centrifugate from Cohn (method 6) fraction I was used as starting material. Preparation of this concentrate is described more in detail by Tullis and coworkers (New England Journal of Medicine, vol. 273 p. 667, 1965). The coagulation factor IX was adsorbed from that concentrate to heparin-SEPHAROSE 4B gel or other similar acting gels (as shortly herein below exemplified), and was eluted from the gel by changing the buffer protein solvent, e.g. by increasing its ionic strength to from about 0.06 M to about 2 M sodium chloride. The factor IX thus obtained showed traces of one additional component as was seen by immunoelectrophoresis. However, further fractionation by gel filtration or SEPHADEX G-150 (an epichlorhydrin cross-linked dextran in bead form, for gel filtration chromatography, having a water-regain value of 15 ml/gm i.e. milligrams per gram of dry beads; product of the aforesaid Pharmacia Fine Chemicals), provided a pure product from an immunological standpoint.

However, a certain heterogenicity as to molecular weight was noted. Further study showed that this was due to the fact the preparation contained both activated factor IX and its non-activated form. The non-activated factor IX had a molecular weight of about 80,000, and the activated factor had a molecular weight of about 50,000. On addition of 0.002 M of p-amino -benzamidine (a protease inhibitor) to the buffer used for dissolving the protein starting material, before admixing the solution with the adsorbent gel, a factor IX preparation was obtained entirely free from activated factor IX and containing only pure factor IX in non-activated form.

Illustrative of the water-insoluble gel matrixes effective in the process of the invention are those having sulfate groups linked to a gel-forming polysaccharide linked to another polysaccharide moiety such as cross-linked dextran sulfate-agarose, cross-linked dextran sulfate-dextran, cross-linked heparin-agarose, cross-linked chondroitin sulfate-agarose, and cross-linked dextran sulfate epichlorhydrin-agarose, and those composed primarily of benzidine disulfonic acid linked to a polysaccharide moiety such as benzidine-2,2-disulfonic acid -agarose and benzidine-2,2-disulfonic acid-dextran. The most common method of preparing these gel matrixes involves providing the cross-linking by use of cyanogen bromide at alkaline pH condition.

The following examples illustrate, but are not to restrict, the invention:

Example 1 -

AHF and fibrinogen isolated from Cohn fraction I-O by adsorbing the fibrinogen on cross-linked dextran sulfate -agarose-gel Preparation of cross-linked dextran sulfate-agarose-gel using 'SEPHAROSE 4B' agarose:

Cyanogen bromide (35 g.) was dissolved in 500 ml. of water followed by addition of 30 g. of dextran sulfate. About 1000 ml. of SEPHAROSE 4B gel and 300 ml. of water were added to them and all were mixed together. The mixture was allowed to stand under agitation, and its PH was constantly kept at 11 for 7 minutes by addition of lye. Thereafter addition of the lye was stopped and the pH was allowed to drop slowly on its own. The agitation was continued for 48 hours at room temperature and followed by washing of the gel. The cross-linked dextran sulfate-SEPHAROSE 4B gel then was ready for use.

FRACTIONATION OF FIBRINOGEN AND AHF FROM COHN FRACTION I-O

About 10 g. of freeze-dried (i.e. lyophilized) Cohn fraction I-O from fresh frozen plasma, containing about 1,500 units AHF, was dissolved in 1,500 ml. of 0.02 M citrate buffer (for pH 6.8). Dry filtered dextran sulfate-SEPHAROSE 4B-gel (1,000 ml.) was added to the solution, and the mixture was agitated for 30 minutes. The gel was then separated and washed with 200 ml. of citrate buffer solution. The non-adsorbed solution and the washing liquid was admixed. Analysis showed this mixed solution to contain 6 percent of the original protein quantity and 65 percent of the AHF-active material of the starting Cohn fraction I-O. The AHF was precipitated by addition of sodium citrate at pH 7.1 to this mixed solution. Dissolution of 0.4 g. of this AHF precipitate in about 35 ml. of glycine-NaCl-phosphate buffer (for pH 6.9) provided a solution with a specific activity of 21 AHF units/ml. The total yield of AHF from the Cohn fraction I-O was 55 percent. Desorption of fibrinogen bound on the gel was effected by elution with 2 M NaCl. The major part of the fibrinogen content of the starting Cohn fraction was regained.

The AHF analyses were carried out according to J. J. Veltkampf et al., Thromb. Diath. Haemorrhag. 19–20 (1968) p. 279. The protein concentration was determined by measuring the UV-absorption at 280 nm.

EXAMPLE 2 -

AHF and fibrinogen from Cohn fraction I paste from outdated plasma by adsorbing the fibrinogen on dextran sulfate -ECD-SEPHAROSE-gel ("ECD-SEPHAROSE" stands for epichloryhydrin treated agarose beads About 1 liter of SEPHAROSE 4B was mixed with 1 liter of 1 M sodium hydroxide and 20 ml. of epichlorhydrin and 5 g. of sodium boro hydride (NaBH$_4$). The mixture was kept at 60° C. under agitation for 1 hour. The gel then was washed with warm water and mixed with 500 ml. of 2 M sodium hydroxide solution containing 2.5 g. sodium boro hydride. The mixture was autoclaved at 120° C. for 1 hour. The gel then was washed with 500 ml. of 0.2 M sodium hydroxide solution containing 2.5 g. of sodium boro hydride. Glacial acetic acid was slowly added until the pH of the mixture had dropped to about 4. The gel was washed with water and coupled with dextran sulfate by use of cyanogen bromide in the same way as described in Example 1.

FRACTIONATION OF FIBRINOGEN AND AHF FROM COHN FRACTION I PASTE

To 1 liter of a solution of Cohn fraction I paste (from outdated plasma) in 0.02 M sodium citrate buffer (for pH 6.8), 1 liter of this cross-linked dextran sulfate-ECD-SEPHAROSE just above prepared gel was added. The mixture was allowed to stand under agitation for 15 minutes followed by decanting the gel (with its bound adsorbate) onto a filler. The starting buffered solution which, before the adsorption step contained about 10 mg. of protein/ml. of solution and 0.5 units AHF/ml., then yielded after the adsorption a non-adsorbed effluent solution which contained 1.4 mg. of protein/ml. and 0.36 AHF-units/ml. From this effluent solution the active AHF-material was precipitated by addition of sodium citrate at pH 7.1. Dissolution of 1 g. of the separated (just above) precipitate in about 20 ml. of the glycine-NaCl-phosphate buffer gave a solution with a specific activity of 16 AHF units/ml. The total yield of AHF was 62 percent.

Desorption of the fibrinogen bound to the gel was done by elution with 2 M sodium chloride solution. More than 90 percent of the fibrinogen was recovered.

EXAMPLE 3 -

AHF and fibrinogen from cryoprecipitate by initially adsorbing the fibrinogen on cross-linked dextran sulfate -SEPHAROSE-gel Cross-linked dextran sulfate-SEPHAROSE 4B gel was prepared as in Example 1. To 1 liter of a solution of 10 g. of cryoprecipitate in 0.02 M sodium citrate buffer (for pH 6.8), 1 liter of this dextran sulfate SEPHAROSE-gel was added. The mixture was agitated for 15 minutes followed by decanting the gel onto a filter and collecting the non-adsorbed solution. The original solution contained about 14 mg. of protein/ml. of the non-adsorbed solution and 0.97 AHF units/liter of solution. The AHF-active material then was precipitated by sodium citrate as earlier described in Examples 1 and 2. Desorption of fibrinogen from the gel was done with 2M NaCl as in Example 1 or 2. Yield of AHF was 65 percent and yield of fibrinogen 82 percent.

EXAMPLE 4 -

AHF and fibrinogen from Cohn fraction I-O by initial adsorption of fibrinogen on cross-linked dextran sulfate-dextran gel 15 g. of dextran "500" (average molecular weight 500,000) was dissolved in 200 ml. of water. 10 g. of cyanogen bromide was dissolved in 100 ml. of water, following which 5 g. of dextran sulfate "500" were added. The solutions were mixed, and the pH was adjusted to 11 by addition of sodium hydroxide and maintained at this value for 7 minutes with simultaneous agitation of the mixture. The resulting gel that formed was allowed to stand 24 hours under agitation and was then washed with 0.1 M sodium bicarbonate buffer and then with water. Fractionation of fibrinogen and AHF and from Cohn fraction I-O: The general fractionation features as described for Example 1 were carried out on Cohn fraction I-O from fresh-frozen plasma used as starting material. This resulted in the just above obtained gel's adsorbing 62 percent of the protein material. The yield of AHF was 90 percent. The fibrinogen was eluted quantitatively with 2 M NaCl.

EXAMPLE 5 -

AHF and fibrinogen from Cohn fraction I-O by initial adsorption of the fibrinogen or cross-linked Heparin-SEPHAROSE gel Preparation of Heparin-SEPHAROSE 4B gel 5 g. of cyanogen bromide was dissolved in 100 ml. water, following which 1.5 g. of heparin was added to the solution and the mixture was allowed to stand under agitation while maintaining the pH constant at 11 for 7 minutes by addition of sodium hydroxide. Thereafter the addition of the lye was stopped and the pH was allowed to drop slowly. The agitation was continued for 48 hours at room temperature following which the gel was washed similar to Example 4.

FRACTIONATION OF FIBRINOGEN AND AHF FROM COHN FRACTION I-O

To 30 ml. of a solution of freeze-dried Cohn fraction I-O from fresh frozen plasma in 0.02 M sodium citrate (for pH 6.8). 10 g. of the just foregoing decanted heparin-SEPHAROSE gel was added.

The mixture was allowed to stand under agitation for 15 minutes, following which the gel (bearing the adsorbate) was decanted onto a filter. 63 percent of the original AHF-activity was left in the non-adsorbed solution as well as 4 percent of the quantity of fibrinogen which was present from the beginning. The AHF-active material then was precipitated by sodium citrate at pH 7.1 as in Example 1. The fibrinogen was eluted from the gel with 2 M NaCl. The yield of fibrinogen was 85 percent.

EXAMPLE 6 -

AHF and fibrinogen from Cohn fraction I-O by adsorption of the fibrinogen to chondroitin sulfate-SEPHAROSE gel Preparation of the cross-linked chondroitin sulfate-SEPHAROSE gel: 1 g, of cyanogen bromide was added to an aqueous solution containing 250 mg. of chondroitin sulfate C following which 40 ml. of SEPHAROSE 4B gel was added. The mixture was allowed to stand at pH 11 under agitation for 7 minutes, following which the pH was allowed to drop, and the resulting gel was allowed to stand under agitation for 48 hours. The gel was then washed and ready for use.

FRACTIONATION OF FIBRINOGEN AND AHF FROM COHN FRACTION I-O

About 0.2 g. of freeze-dried Cohn fraction I-O from fresh frozen plasma was dissolved in 20 ml. of citrate buffer (for pH 6.8). Later on 20 ml. of the just obtained gel was added and the mixture was allowed to stand under agitation for 15 minutes, following which the gel (with its adsorbate) was separated by filtration. Analysis of the non-adsorbed filtrate solution showed that 44 percent of the fibrinogen had been adsorbed on the gel. The AHF-yield was 80 percent. The fibrinogen was desorbed from the gel with 2 M NaCl as in any of Examples 1, 2, 4 or 5.

EXAMPLE 7 -

AHF and fibrinogen from Cohn fraction I-O by initial adsorption of the fibrinogen to dextran sulfate-SEPHAROSE gel prepared by epichlorhydrin induced cross-linking Preparation of cross-linked dextran sulfate SEPHAROSE gel according to ECD-process: 1 liter of SEPHAROSE 4B gel was mixed with 500 ml. of an aqueous solution containing 30 g. dextran sulfate. To this mixture 1 liter of 1 M sodium hydroxide solution, 40 ml. of epichlorohydrin and 10 g. of sodium boro hydride were added. The mixture was kept at 60° C. under agitation for 1 hour. The resulting gel was washed with warm water and mixed with 500 ml. of 2 M sodium hydroxide solution and 5 g. of sodium boro hydride.

The mixture was autoclaved for 1 hour at 120° C., following which the gel was washed with a solution of lye containing sodium boro hydride. Thereafter, glacial acetic acid was added slowly until pH 4. The gel was washed with water and was then ready for use.

FRACTIONATION OF FIBRINOGEN AND AHF FROM COHN FRACTION I-O

Freeze-dried Cohn fraction I-O fresh frozen plasma was dispersed in the citrate buffer and admixed with the cross-linked dextran sulfate SEPHAROSE 4B gel as in Example 1, and the gel with its adsorbate and the mixed non-adsorbed solution and gel washing were treated as described in Example 1. The non-adsorbed solution obtained after adsorption of the fibrinogen on the gel contained 5 percent of the original protein content and 57 percent of its AHF-activity. The AHF-active material then was precipitated with sodium citrate, for example, as in Example 2. Elution of fibrinogen from the gel with 2 M NaCl, and its yield was 90 percent.

EXAMPLE 8 -

AHF and fibrinogen from Cohn fraction I-O by adsorbing the fibrinogen to benzidine disulfonic acid substituted SEPHAROSE gel Preparation of benzidine disulfonic acid substituted SEPHAROSE gel: 250 ml. of SEPHAROSE 4B gel were admixed into 100 ml. water, and 10 g. of cyanogen bromide dissolved in 100 ml. water were added. By addition of a solution of sodium hydroxide the pH was increased to 11.0 and kept at that level under agitation for 7 minutes, following which the treated gel was decanted onto a glass filter and washed with cold water. 14 g. of benzidine -2,2-disulfonic acid were dissolved in 60 ml. of water under simultaneous addition of lye to maintain the pH at 7. The benzidine disulfonic acid solution was added to the gel and their mixture was allowed to stand under agitation at 5° C. over night, followed by washing of the gel with buffer solutions.

FRACTIONATION OF FIBRINOGEN AND AHF FROM COHN FRACTION I-O

About ½ g. of freeze-dried Cohn fraction I-O from fresh frozen plasma was dissolved in 40 ml. water and 10 ml. of suctioned dry gel was added, following which the mixture was agitated for 30 minutes. The gel was filtered off and the fibrinogen was eluted from the gel with 2 M NaCl solution as in any of the earlier examples. By using sodium citrate the AHF-active material was precipitated and removed in the way described in earlier examples. 85 percent of the original fibrinogen had been adsorbed on the matrix, and the AHF yield was 80 percent.

EXAMPLE 9 - factor IX obtained from plasma adsorption to heparin SEPHAROSE gel

Heparin-SEPHAROSE gel was prepared by mixing 100 ml. of a heparin solution (5,000 units/ml.) in water to 200 ml. of SEPHAROSE 4B gel, followed by addition of 4 g. of cyanogen bromide. The pH was adjusted to 11 and kept there for 7 minutes, following which the pH was allowed to drop. The gel was allowed to stand over night under agitation, washed the following day and was then ready for use.

To a column (volume 200 ml.) packed with the cross-linked heparin-SEPHAROSE gel and equilibrated with 0.02 M tris(hydroxymethyl)aminomethane, 0.01 M citrate, 0.15 M NaCl buffer (for pH 8.4), 40 ml. of human blood plasma was fed. On eluting this cross-linked gel with this same buffer, the non-adsorbed major part of the plasma was washed straight through the column. The adsorbate on the column then was eluted by gradient elution with 0.05 M citrate buffer (for pH 5.0), with continuously increasing its ionic strength by addition of 2 M NaCl. Dialysis of this eluate against distilled water and then lyophilizing the residue -dialysate yielded a fraction with factor IX activity, whose specific activity was 60 times that of the starting plasma calculated per mg. of protein. Yield 35 percent.

Determination of factor IX activity was made by coagulation analysis according to the method in J. J. Veltkampf et al. (Thromb. Diath. Haemorrhag., 19–20 (1968) p. 279).

EXAMPLE 10 -

Factor IX obtained from a B-factor concentrate by adsorption to heparin-SEPHAROSE gel The B-factor concentrate (having 8 factor IX units/ml.) used as starting material was prepared by adsorbing the supernatant liquid from Cohn (method 6) fraction I (Jour. Am. Chem. Soc., supra p. 6 lines 18–19) to DEAE-SEPHADEX gel and subsequent elution from that gel with a commonly used protein solvent buffer in known manner.

About 0.5 g. of protein (as this B-factor concentrate) containing about 400 units of factor IX was dissolved in 35 ml. of 0.03 M sodium citrate, 0.06 M NaCl (pH 7.6) buffer. The solution was fed onto a column (210 ml. in volume) of cross-linked heparin -SEPHAROSE 4B gel prepared as described in Example 5 which had been equilibrated with this citrate-NaCl buffer. On eluting this cross-linked gel with this same buffer, the non -adsorbed major part of the starting concentrate was washed straight through the column. Desorption of the adsorbed factor IX was achieved by gradient elution of this gel column with 0.1 acetic acid, sodium acetate buffer (pH 5.0), with continuously increasing its ionic strength by addition of the corresponding buffer containing 2 M NaCl. Lyophilization of this eluate yielded a protein fraction with a strong factor IX activity.

Calculation of the activity yield showed that 86 percent of the activity was recovered. Immunoelectrophoresis showed this product contained traces of another component. Further gel filtration run on SEPHADEX G-150 yielded activity noted in two areas, partly at elution volume corresponding to a molecular weight of about 80,000 and partly at elution volume corresponding to a molecular weight of 50,000. The lower molecular weight material appears to be activated factor IX. The degree of purity of the higher molecular weight material compared with that of the starting concentrate shows about a 40 times purification.

EXAMPLE 11 - factor IX from B-factor concentrate by adsorption to cross-linked heparin-SEPHAROSE gel in presence of a protease-inhibitor About 0.5 g. of B-factor concentrate (as in Example 10) containing about 400 units factor IX was dissolved in 35 ml. of 0.03 M citrate, 0.06 M NaCl, 0.002 M p-aminobenzamidine budfer (pH 7.6) (p-aminobenzamidine being a protease-inhibitor inhibiting, among others, trypsin and thrombin). The solution was fed into a column containing cross -linked heparin-SEPHAROSE 4B gel, which thereafter was eluted and desorbed as described in Example 10.

A fraction with high factor IX activity was obtained after elution with 0.01 M tris(hydroxymethyl)aminomethane buffer. Further separation on SEPHADEX G-150 gel yielded an active homogeneous protein with a molecular weight of 82,000. Total yield of factor IX activity was 370 units (92.5 percent), a 52 times purification.

EXAMPLE 12 - activated factor IX from Cohn (method 6) fraction III by adsorption to cross-linked heparin-SEPHAROSE gel About 10 kg. of Cohn (method 6) fraction III paste (Jour. Am. Chem. Soc., supra p. 6 lines 18–19) were dissolved in 40 liters of 0.01 M disodium monohydrogen and monosodium dihydrogen phosphates, 0.15 M NaCl (pH 7) buffer. Undissolved material was centrifugated off. 18 liters of DEAE-SEPHADEX gel were added to the solution. Their mixture was allowed to stand under agitation for 1 hour, following which the DEAE-SEPHADEX gel was separated (decanted) and washed with the above buffer. A column was packed with the gel which thereafter was desorbed with 0.05 M phosphates, 1 M NaCl (pH 7) buffer. A 180 g. (eluate) protein fraction with factor IX activity was obtained. This eluate solution, after dialysis (against distilled water) and change of buffer to 0.03 M citrate, 0.06 M NaCl (pH 7.6), was adsorbed to 6 liters of cross-linked heparin-SEPHAROSE 4B gel. This adsorbate-bearing gel was charged into a column and then eluted as in Example 9. That yielded a fraction with factor IX activity. Gel filtration studies showed that this material was mainly activated factor IX, i.e. the component with the molecular weight of about 50,000.

EXAMPLE 13 - factor IX from B-factor concentrate by adsorption to cross-linked heparin gel

Cross-linked heparin gel was prepared by adding 6 g. of cyanogen bromide to 100 ml. of a solution of heparin (5000 units/ml.). The pH was adjusted to 11 and kept at this level for 8 minutes, following which the pH was allowed to drop on its own. A gel formed which was allowed to stand a couple of hours and then was washed with bicarbonate buffer and then with water, following which the cross-linked heparin gel was ready for use.

A column was packed with this gel and a (buffer) solution of B-factor concentrate (as in Example 10) was charged into it. Adsorption and elution were carried out as in Example 9, and a factor IX fraction was obtained with a relatively high degree of purification (27 times compared with that of the starting B-factor concentrate). Yield 62 percent.

EXAMPLE 14 - factor IX from B-factor concentrate by adsorption to cross-linked dextran sulfate-SEPHAROSE gel Cross-linked dextran sulfate-SEPHAROSE gel was prepared by adding 100 ml. of SEPHAROSE 4B gel to 50 ml. of dextran sulfate following which 2 g. of cyanogen bromide were added. The pH was adjusted to 11 and kept for 7 minutes following which it was allowed to drop on its own. The cross-linked dextran sulfate gel was allowed to stand over night and was then washed. This cross-linked gel was packed into a column and a solution of B-factor concentrate (as in Example 10) was fed into it. Desorption and elution were carried out as in Example 9. The purification obtained was about 12 times that of the starting material's and the yield was 17 percent.

EXAMPLE 15 factor IX from B-factor concentrate by adsorption to cross-linked chondroitin sulfate-SEPHAROSE gel Cross-linked chondroitin sulfate C-SEPHAROSE gel was produced by using chondroitin sulfate C in procedure corresponding to that used for cross-linked dextran sulfate-SEPHAROSE gel in Example 6.

The resulting cross-linked gel was packed into a column and a solution of B-factor concentrate (as in Example 10) was charged into it and elution and desorption were conducted as in Example 9. The purification extent obtained was about 30 times that of the starting material's and the yield was 37 percent.

EXAMPLE 16 - purification of factor I, VIII and IX from the same starting material

Dextran sulfate-SEPHAROSE gel was prepared according to Example 1 with the exception that the scale was increased to 10 liters of gel. Heparin-SEPHAROSE gel was prepared according to Example 9 but the scale was increased to give one liter of gel.

30 kilos of frozen plasma was thawed, followed by precipitation of Cohn (method 6) fraction I by 8 percent ethanol and centrifugation in a Sharples centrifuge. The supernatant was collected and used for preparation of factor IX as described later in this example. The fraction I precipitate was cut to pieces and dissolved in 9.6 liters of 0.02M citrate buffer pH 6.8. To the solution was added 180 ml. of 2 percent Al(OH)$_3$ gel and the mixture was stirred for 30 minutes and the gel was taken away by centrifugation. To the solution is then added 10 liters of dextran sulfate-SEPHAROSE gel and the mixture is stirred for 30 minutes. The gel is separated on a filter and the AHF-active material present in the solution is precipitated by addition of sodium citrate as described earlier. The precipitated material contained 0.7 AHF units/mg of protein and it could be dissolved yielding a solution containing 30 AHF units/ml. The yield as calculated from the AHF content of the plasma was 34 percent. The fibrinogen (factor I) could be obtained by elution of the dextran sulfate-SEPHAROSE gel with 2M NaCl.

The fibrinogen obtained was 89 percent pure and the yield was 84 percent.

Factor IX was prepared from the supernatant after precipitation of Cohn fraction I. To this solution (32 liters) was added 5 liters of swollen DEAE-SEPHADEX gel. The mixture was stirred for one hour followed by separation of the gel by decantation. After washing the DEAE-SEPHADEX gel was eluted with 0.05 M phosphate 1 M NaCl, pH 7.0. The protein fraction obtained was dialyzed against 0.03 M citrate, 0.06 M NaCl, pH 7.6. To the solution was added one liter of heparin-SEPHAROSE gel under stirring. The gel was packed on a column and desorbed according to Example 9. A fraction with factor IX activity was obtained which after dialysis and lyophilization was subjected to gel filtration on SEPHADEX G200. A factor IX preparation was obtained which contained 52 units/mg of protein. The total yield from plasma was 47 percent.

Examples 9 to 15 show the isolation of the single blood coagulation factor i.e. IX, from their respectively separate starting materials. Examples 1 to 8 illustrate the separate respective isolation of the two blood coagulation factors, fibrinogen and AHF, from a respective single starting material. Example 16 exemplifies the separate isolation of each of the three blood coagulation factors from a single starting material.

The various examples show use of their respective specific starting material source for any one, two or three of the blood coagulation factors I, VIII and IX. However, any animal blood tissue product containing any of these blood coagulation factors can be used. Such blood tissue product can be that of any blood-bearing animal, whether human or bovine or other mammal or other animal, that contains any of these coagulation factors.

That expression "animal blood tissue product" then embraces primarily blood serum, blood plasma (whether fresh or outdated) as well as any of the blood coagulation factor-containing fractions or concentrates derived from human or bovine or other blood-bearing animal blood, blood serum, or blood plasma, such as the cryoprecipitate, as well as the also earlier available different types of AHF concentrates as the so-called partly low and the partly high concentrated preparations, or the so-called concentrated AHF preparations, or the B-factor concentrate.

The dextran sulfate used in several of the examples is, as furnished by its supplier (the aforementioned Pharmacia Fine Chemicals) actually sodium dextran sulfate. It commonly is referred to as merely dextran sulfate, not only by the suppliers and in its literature but in other literature. It is supplied as the sodium salt because of its greater stability over time in that form. It may be used in either form in the invention, so that the expression "sulfate dextran" is used herein for the sodium salt form as well.

The SEPHAROSE 4B is no supplied as dry beads. Thus, in those of the examples which mention taking a certain volume of this adsorbing agent, it was used instead in its form, as supplied, as a viscous flowable but not freely liquid-flowable form.

In the expression "cross-linked dextran sulfate epichlorohydrin-agarose" the portion "epichlorohydrin-agarose" means that the agarose independently was reacted separately with epichlorohydrin. Thus, "cross-linked" in the longer of these two quoted expressions relates, as Example 2 shows, that there also was a cross-linking by a separate cross-linking reaction between the dextran sulfate and the epichlorohydrin-treated agarose.

In addition, Example 7 shows that epichlorohydrin can be used as the cross-linking agent in the reaction medium containing dextran sulfate and agarose (e.g. SEPHAROSE 4B) to provide the cross-linking between the two polysaccharide substances used in preparing the cross-linked water-insoluble gel matrix for the process of the invention. Thus, such gel matrix is referred to in Example 11 as ECD-cross-linked dextran sulfate agarose gel.

The cross-linked benzidine-2,2-disulfonic acid-agarose of Example 8 can be replaced in its procedure by the corresponding quantity of cross-linked benzidine-2,2-disulfonic acid-dextran by replacing the SEPHAROSE 4B used in preparing its cross-linked benzidine-agarose gel by the corresponding quantity of dextran.

Generally the specific buffer used in any of the examples as a solvent for the starting animal blood tissue product, or any adsorbate, or any precipitate can be replaced by any other aqueous buffer solution that is compatible with the starting blood tissue product, adsorbate, or precipitate and provides the required pH to dissolve the specific tissue product. adsorbate, or precipitate.

The non-adsorbed portion of any starting material solution ordinarily can be washed out of the adsorption mixture of column with a single volume of the starting buffer solution equal to the volume of the gel used in the mixture or column.

The process of the invention enables providing a (i) fibrinogen product containing from about 80 to 90 percent of actual fibrinogen, (ii) coagulation factor VIII (AHF) product of a greater purity than that of any other commercially available AHF product, and (iii) the purest anticoagulation factor B (factor IX) product.

That gives a valuable advantage by very markedly reducing the amount of liquid containing any of these three coagulation factors to be administered to a patient, with consequent not only saving in cost, but also reduced distress to the patient. For example, the AHF product prepared from fresh plasma by the method of Examples 2 and 16 is available in a concentration of 30 AHF units per ml. That enables administering a highly effective dosage merely as an ordinary injection by a hand syringe and eliminating the need for prolonged continuous infusion from a suspended infusion bottle.

While the invention has been explained by detailed description of certain specific embodiments of it, it is understood that various modifications or substitutions can be made in any of them within the scope of the appended claims which are intended also to cover equivalents of the specific embodiments.

What is claimed is:

1. The method of isolating the blood coagulation factors fibrinogen, the antihemophilia factor, and B-factor from blood plasma, which comprises admixing liquid plasma with 8 percent ethanol to precipitate the Cohn (method 6) fraction I, and subjecting the resulting mixture to centrifugation;

separating the thus settled Cohn (method 6) fraction I, cutting it into pieces and dissolving it in citrate buffer in the ratio of the amount of fraction I precipitate derived from 30 kilos of starting plasma to 9.6 liters of 0.02M citrate buffer providing pH 6.8, admixing the resulting solution and 180 milliliters of 2 percent aluminum hydroxide gel, and after stirring the mixture, removing the gel by centrifugation;

removing the supernatant from this centrifugation of the aluminum hydroxide gel mixture and admixing it with 10 liters of cyanogen bromide cross-linked dextran sulfate-agarose gel and after stirring the resulting mixture filtering it, admixing the filtrate with the foregoing 0.02M citrate buffer thereby precipitating the antihemophilia factor;

then eluting the cyanogen bromide cross-linked dextran sulfate-agarose gel residue of this filtration with 2M sodium chloride solution thereby to remove the thereon adsorbed fibrinogen;

admixing 5 liters of swollen epichlorohydrin cross-linked diethylaminoethyl dextran beads with 32 liters of the supernatant from the Cohn (method 6) fraction I precipitate, stirring the resulting mixture and separating these beads by decanting off the liquid phase;

eluting the adsorbate from the separated beads with 0.05M phosphate and 1M sodium chloride buffer which provides a pH of 7, dialyzing the eluate against 0.03M citrate and 0.06M sodium chloride buffer that provides pH 7.6, admixing the dialysate with 1 liter of cyanogen bromide cross-linked heparin-agarose gel with stirring, eluting that dialysate-wetted gel by gradient elution with 0.05M citrate buffer that provides pH 5.0, by regularly increasing the ionic strength of that buffer by adding 2M sodium chloride; and dialyzing that eluate against distilled water, thereby leaving the dialysis residue as the B-factor product.

* * * * *

UNITED STATES PATENT AND TRADEMARK OFFICE
CERTIFICATE OF CORRECTION

PATENT NO. 3,920,625

DATED November 18, 1975

INVENTOR(S): Lars-Olov Andersson, Håkan Gunnar Borg, Nanna Forsman, Gunnar Hanshoff, Göran Lindroos, Maggie Miller-Andersson, et al.

It is certified that error appears in the above-identified patent and that said Letters Patent are hereby corrected as shown below:

Column 1 line 17 "andn" should read -- and --; line 52 "formed, namely," should read -- other --; line 60 before "thrombin" insert -- namely --; line 67 "type" should read -- types --. Column 2 line 17 "would" should read -- wound --; line 37 "Blomback" should read Blombäck. Column 3 line 23 "and" should read -- an --; line 50 "sufateagarose" should read -- sulfate-agarose --; line 52 before "solution" insert -- aqueous --; line 55 "absorb" should read -- adsorb --; line 61 "p. 4 lines 13-14" should read -- column 2 lines 35-38 --. Column 4 line 4 "theh" should read -- the --; line 11 delete first occurrence of "or like blood". Column 5 line 32 "was" should read -- were --. Column 6 line 63 after "AHF" omit -- and --. Column 7 line 45, "," should read -- g. --. line 59 after "just" insert -- above. Column 10 line 18 "budfer" should read -- buffer --. Column 11 line 19 after "kept" insert -- there --. Column 12 line 15 after "was" insert -- then --; line 61 "no" should read -- not --. Column 13 line 30, "product." should read -- product, --; line 34, "of" first occurrence, to read -- or --.

Signed and Sealed this

Eleventh Day of January 1977

[SEAL]

Attest:

RUTH C. MASON
*Attesting Officer*

C. MARSHALL DANN
*Commissioner of Patents and Trademarks*